US011113082B2

(12) United States Patent
Redin et al.

(10) Patent No.: US 11,113,082 B2
(45) Date of Patent: Sep. 7, 2021

(54) HELP CONTENT BASED APPLICATION PAGE ANALYSIS

(71) Applicant: Hewlett-Packard Development Company, L.P., Spring, TX (US)

(72) Inventors: Ricardo Miotto Redin, Porto Alegre (BR); Lucia Maciel, Porto Alegre (BR); Marcio Bortolini, Porto Alegre (BR); Alan Aguirre, Porto Alegre (BR); Thaua Garcia Silveira, Porto Alegre (BR); Ricardo Alexandre de Oliveira Staudt, Porto Alegre (BR); Ricardo Moreira, Porto Alegre (BR); Alessandro Carlos Hunhoff, Porto Alegre (BR); Leandro Cado, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/755,027

(22) PCT Filed: Oct. 16, 2017

(86) PCT No.: PCT/US2017/056783
§ 371 (c)(1),
(2) Date: Apr. 9, 2020

(87) PCT Pub. No.: WO2019/078814
PCT Pub. Date: Apr. 25, 2019

(65) Prior Publication Data
US 2021/0191742 A1 Jun. 24, 2021

(51) Int. Cl.
*G06F 3/048* (2013.01)
*G06F 9/451* (2018.01)
(Continued)

(52) U.S. Cl.
CPC ............. *G06F 9/453* (2018.02); *G06F 3/048* (2013.01); *G06F 16/24578* (2019.01);
(Continued)

(58) Field of Classification Search
None
See application file for complete search history.

(56) References Cited

U.S. PATENT DOCUMENTS 7,356,537 B2  4/2008  Reynar et al.
8,676,790 B1  3/2014  Henzinger
(Continued)

OTHER PUBLICATIONS

Helpstudio is the Help Authoring Tool Trusted by Individuals and Corporations Worldwide Since 2003, https://www.innovasys.com/ ~ 2017 ~ 7 pages.

*Primary Examiner* — Tuan S Nguyen
(74) *Attorney, Agent, or Firm* — Mannava & Kang

(57) ABSTRACT

In some examples, with respect to help content based application page analysis, pages that are to be analyzed with respect to application help content may be ascertained for an application. A user interaction element may be identified for each of the ascertained pages. Selection of a user interaction element from the identified user interaction elements may be ascertained for a page of the ascertained pages. Responses to inquiries from a decision tree that corresponds to the selected user interaction element may be ascertained for the selected user interaction element. A score that represents relevancy of page help content to the application may be determined based on the ascertained responses. The page help content may be associated with the page and may be part of the application help content.

15 Claims, 10 Drawing Sheets

(51) Int. Cl.
  *G06F 16/28* (2019.01)
  *G06N 5/00* (2006.01)
  *G06F 16/2457* (2019.01)
  *G06Q 10/10* (2012.01)

(52) U.S. Cl.
  CPC .......... *G06F 16/285* (2019.01); *G06N 5/003* (2013.01); *G06Q 10/101* (2013.01)

(56) References Cited

U.S. PATENT DOCUMENTS

| | | |
|---|---|---|
| 8,719,706 B2 | 5/2014 | Harris et al. |
| 8,775,924 B1 | 7/2014 | Bilinski |
| 9,335,911 B1 | 5/2016 | Elliot |
| 9,389,882 B2 | 7/2016 | Armstrong et al. |
| 9,600,300 B2 | 3/2017 | Jhoney et al. |
| 9,715,395 B2 | 7/2017 | Kureshy et al. |
| 9,996,587 B1 * | 6/2018 | Price .................. G06Q 30/0278 |
| 10,698,706 B1 * | 6/2020 | Rabe ..................... G06F 3/0484 |
| 2006/0085750 A1 * | 4/2006 | Easton, Jr. .............. G06F 9/453 |
| | | 715/708 |
| 2007/0239760 A1 | 10/2007 | Simon |
| 2010/0083183 A1 | 4/2010 | Yan |
| 2010/0114654 A1 | 5/2010 | Lukose |
| 2014/0337727 A1 | 11/2014 | Earumthavadi et al. |
| 2019/0018692 A1 * | 1/2019 | Indyk ..................... G06F 9/453 |

* cited by examiner

```
{
  "totalPages":"7",  ← 600
  "listPages":[
    {
      "id":0,
      "name":"First Page",
      "score": 8,  ← 604
      "type":"page",
      "listElements":[  ← 606
        {
          "id":0,
          "name":"Input #1",
          "type":"input",
          "restriction":"none",
          "size":200,
          "inserted":"YES",
          "article":"FAQ"
        },
        {
          "id":1,
          "name":"Input #2",
          "type":"input",
          "restriction":"number",
          "size":8,
          "inserted":"NO – Not relevant",
          "article":"FAQ"
        },
      ]
    }
  ],
  "article":"Document"  ← 602
}
```

```
┌─────────────────────────────────────────────────────────┐
│ ASCERTAIN, FOR AN APPLICATION, PAGES THAT ARE TO BE    │
│ ANALYZED WITH RESPECT TO APPLICATION HELP CONTENT       │
│ 902                                                     │
└─────────────────────────────────────────────────────────┘
                            ▼
┌─────────────────────────────────────────────────────────┐
│ IDENTIFY, FOR EACH OF THE ASCERTAINED PAGES, A USER     │
│ INTERACTION ELEMENT                                      │
│ 904                                                     │
└─────────────────────────────────────────────────────────┘
                            ▼
┌─────────────────────────────────────────────────────────┐
│ ASCERTAIN, FOR A PAGE OF THE ASCERTAINED PAGES,         │
│ SELECTION OF A USER INTERACTION ELEMENT FROM THE        │
│ IDENTIFIED USER INTERACTION ELEMENTS                    │
│ 906                                                     │
└─────────────────────────────────────────────────────────┘
                            ▼
┌─────────────────────────────────────────────────────────┐
│ ASCERTAIN, FOR THE SELECTED USER INTERACTION ELEMENT,   │
│ RESPONSES TO INQUIRIES FROM A DECISION TREE THAT        │
│ CORRESPONDS TO THE SELECTED USER INTERACTION ELEMENT    │
│ 908                                                     │
└─────────────────────────────────────────────────────────┘
                            ▼
┌─────────────────────────────────────────────────────────┐
│ DETERMINE, BASED ON THE ASCERTAINED RESPONSES, A SCORE  │
│ THAT REPRESENTS RELEVANCY OF PAGE HELP CONTENT TO THE   │
│ APPLICATION                                             │
│ 910                                                     │
└─────────────────────────────────────────────────────────┘
                            ▼
┌─────────────────────────────────────────────────────────┐
│ RANK THE ASCERTAINED PAGES WITH RESPECT TO THE          │
│ APPLICATION HELP CONTENT BY RANKING THE PAGE ACCORDING  │
│ TO THE SCORE AND DETERMINED SCORES FOR OTHER PAGES OF   │
│ THE APPLICATION                                         │
│ 912                                                     │
└─────────────────────────────────────────────────────────┘
```

*FIG. 9*

HELP CONTENT BASED APPLICATION PAGE ANALYSIS

BACKGROUND

An application, such as a web application, may include a plurality of pages. The application may include a help menu that may be searched for help content to ascertain information on various aspects of the application. For example, the help menu may be searched to ascertain information on compatible operating systems that are usable with the application.

BRIEF DESCRIPTION OF DRAWINGS

Features of the present disclosure are illustrated by way of example and not limited in the following figure(s), in which like numerals indicate like elements, in which:

FIG. 6 illustrates a metadata interaction report to illustrate operation of the help content based application page analysis apparatus of FIG. 1;

FIG. 9 illustrates an example flowchart of a method for help content based application page analysis.

DETAILED DESCRIPTION

Figure 1:
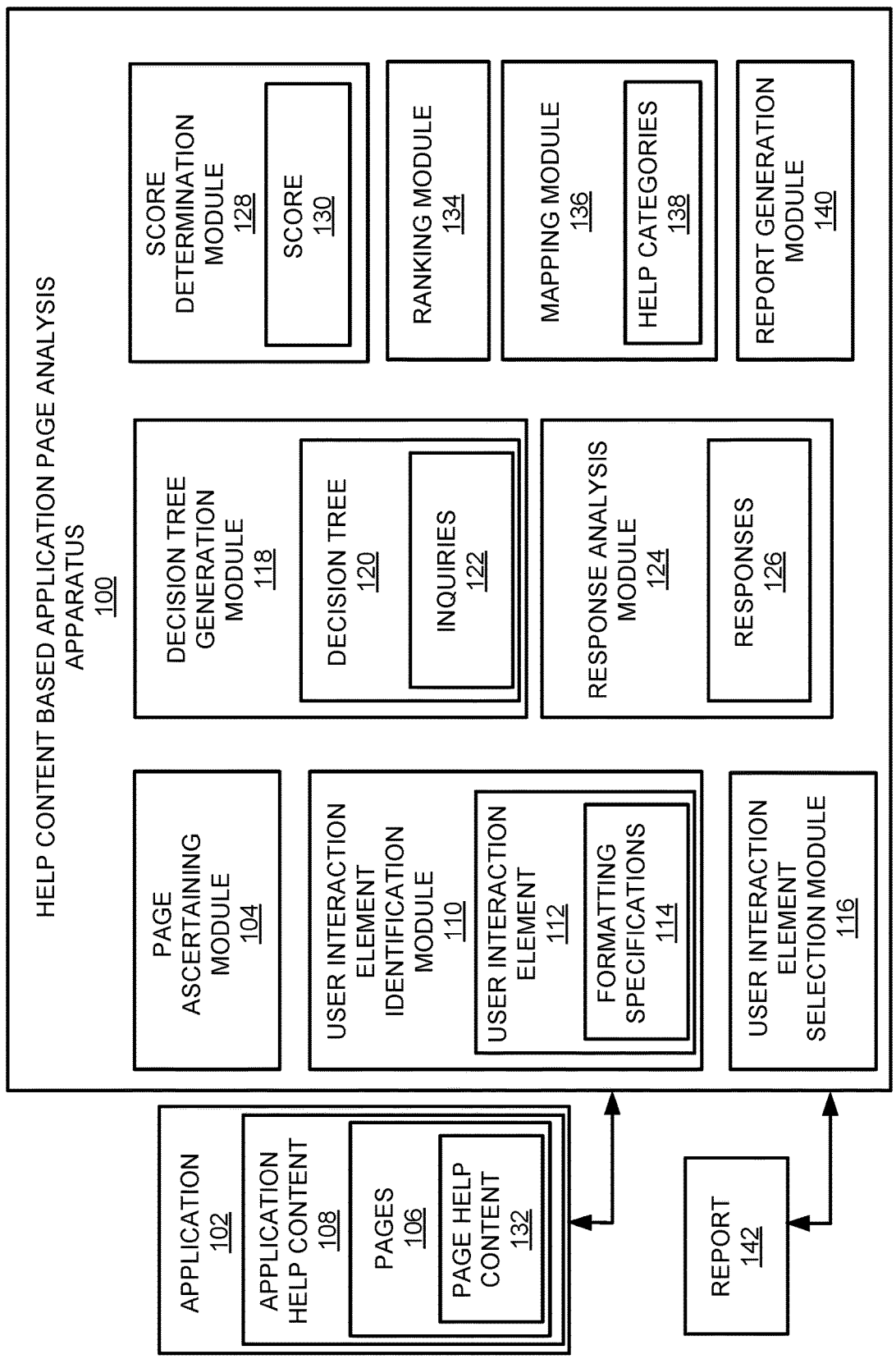
FIG. 1 illustrates an example layout of a help content based application page analysis apparatus.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Help content based application page analysis apparatuses, methods for help content based application page analysis, and non-transitory computer readable media having stored thereon machine readable instructions to provide help content based application page analysis are disclosed herein. The apparatuses, methods, and non-transitory computer readable media disclosed herein provide for analysis of user interaction elements of an application page to generate help content. Further, the apparatuses, methods, and non-transitory computer readable media disclosed herein provide for analysis of decision tree based inquiries that are used to ascertain responses, for example, from a help content creator, with the responses being further used to generate a score that represents relevancy of page help content to the application.

With respect to applications, such as web applications, help content is a factor that may positively or negatively affect user experience during operation of the application. Help content may be used to provide a direct or indirect means of communication between an application developer and an application user. For example, during operation of the application, the application user may select a help menu to comprehend different aspects related to the operation of the application. For example, when the application user encounters an input field into which information is to be entered, the application user may access the help menu to determine what type of information is acceptable for entry. An example of acceptable information may include numeric information. As applications increase in complexity, it is technically challenging to ascertain where help content should be added in an application, whether the quality of existing help content is adequate, the relevancy of help content for a page to the overall application, and whether the application includes sufficient help content.

In order to address at least the aforementioned technical challenges, the apparatuses, methods, and non-transitory computer readable media disclosed herein provide for help content creation that targets the correct balance between quality and quantity of help content. In this regard, with respect to an application, pages that are to be analyzed with respect to application help content (e.g., overall help content for the application) may be ascertained. A user interaction element may be identified for each of the ascertained pages.

Examples of user interaction elements may include an input field for receiving user input, a checkbox to enable selection of any number of options from a list of options, a radio button to limit selection of an option from another list of options, a drop-down menu to enable selection of an option from a further list of options displayed upon actuation of the drop-down menu, an action button to enable performance of an action upon selection of the action button, a table that displays data, and/or an image that displays information.

For the apparatuses, methods, and non-transitory computer readable media disclosed herein, selection of a user interaction element from the identified user interaction elements may be ascertained for a page of the ascertained pages. For each of the identified user interaction elements, formatting specifications may be determined. Examples of formatting specifications may include a type of information (e.g., numbers, text, etc.) that may be entered in a user interaction element, a size of the user interaction element, etc.

Based on the formatting specifications, a decision tree may be generated to include the inquiries related to the formatting specifications of the selected user interaction element. Responses to inquiries from the decision tree that corresponds to the selected user interaction element may be ascertained for the selected user interaction element. A score that represents relevancy of page help content (e.g., help content for the page) to the application may be determined based on the ascertained responses. The page help content may be associated with the page and may be part of the application help content. Scores for other pages of the application may be determined in a similar manner. The ascertained pages may include the page and the other pages.

The ascertained pages may be ranked with respect to the application help content based on the determined score for the page and the determined scores for the other pages of the application. The ranking of the ascertained pages may provide an index of how the help content for a page is related to the overall help content for the application.

The apparatuses, methods, and non-transitory computer readable media disclosed herein may further provide a report that may be used by a help content creator to better understand how to create relevant help content for a final user.

The apparatuses, methods, and non-transitory computer readable media disclosed herein may further provide the ability to create help content from the beginning of application development, thus saving resources, time, and effort invested in unused help content.

The apparatuses, methods, and non-transitory computer readable media disclosed herein may further provide for leveling of help information if an application has a diverse customer base with different knowledge levels.

For the apparatuses, methods, and non-transitory computer readable media disclosed herein, modules, as described herein, may be any combination of hardware and programming to implement the functionalities of the respective modules. In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates an example layout of a help content based application page analysis apparatus (hereinafter also referred to as "apparatus 100"). According to an example, the apparatus 100 may be implemented as a web browser plugin to add a new capability to a browser on which an application 102 operates. Alternatively or additionally, the apparatus 100 may be implemented separately from a web browser or another environment on which the application 102 operates.

Referring to FIG. 1, the apparatus 100 may include a page ascertaining module 104 to ascertain, for the application 102, pages 106 that are to be analyzed with respect to application help content 108.

A user interaction element identification module 110 is to identify, for each of the ascertained pages 106, a user interaction element 112 (hereinafter also referred to as identified user interaction elements 112).

The user interaction element identification module 110 is to determine, for each of the identified user interaction elements 112, formatting specifications 114.

A user interaction element selection module 116 is to ascertain, for a page of the ascertained pages 106, selection of a user interaction element from the identified user interaction elements 112.

A decision tree generation module 118 is to generate, based on the formatting specifications 114, a decision tree 120 to include inquiries 122 related to the formatting specifications of the selected user interaction element.

A response analysis module 124 is to ascertain, for the selected user interaction element, responses 126 to the inquiries 122 from the decision tree 120 that corresponds to the selected user interaction element.

A score determination module 128 is to determine, based on the ascertained responses 126, a score 130 that represents relevancy of page help content 132 to the application 102. The page help content 132 may be associated with the page and is part of the overall application help content 108. The score determination module 128 is to determine scores for other pages of the application 102 in a similar manner. The ascertained pages 106 may include the page and the other pages.

According to examples, the score determination module 128 is to determine, based on the ascertained responses 126, the score 130 that represents relevancy of page help content 132 to the application 102 by ascertaining a default score value, and ascertaining, for the page, a total number of user interaction elements. Further, the score determination module 128 is to determine a weighted value by dividing the default score value by the total number of user interaction elements. Further, the score determination module 128 is to determine the score that represents relevancy of the page help content 132 to the application 102 by reducing the default score value by a total number of negative responses to the inquiries multiplied by the weighted value.

A ranking module 134 is to rank the ascertained pages 106 with respect to the application help content 108 based on the determined score 130 for the page and the determined scores for the other pages of the application 102.

A mapping module 136 is to map the responses 126 to the inquiries 122 to a help category of a plurality of help categories 138. According to an example, the mapping module 136 is to attach to the selected user interaction element, based on the mapping of the responses 126 to the inquiries 122 to the help category of the plurality of help categories 138, an article that is relevant to the help category of the plurality of help categories 138.

A report generation module 140 is to generate a report 142 of the mapping of the responses 126 to the inquiries 122 to the help category of the plurality of help categories 138.

Operation of the apparatus 100 is described in further detail with reference to FIGS. 1-7.

Referring again to FIG. 1, as disclosed herein, the user interaction element identification module 110 is to identify, for each of the ascertained pages 106, the user interaction element 112. In this regard, the user interaction element 112 may include any Hypertext Markup Language (HTML) element of the page that needs user interaction (e.g., any type of entry of information, analysis of information, interpretation, etc.). Examples of user interaction elements 112 may include an input field for receiving user input, a checkbox to enable selection of any number of options from a list of options, a radio button to limit selection of an option from another list of options, a drop-down menu to enable selection of an option from a further list of options displayed upon actuation of the drop-down menu, an action button to enable performance of an action upon selection of the action button, a table that displays data, and/or an image that displays information. For the input field for receiving user input, the input field may include text, passwords, date/time information, numbers, emails, Uniform Resource Locators (URLs), files, etc. For the table that displays data, such tables may also include charts, and the displayed data may need additional explanation for appropriate interpretation. For the images that display information, such images may also include labels and other types of text that is used to display some type of information.

Figure 2:
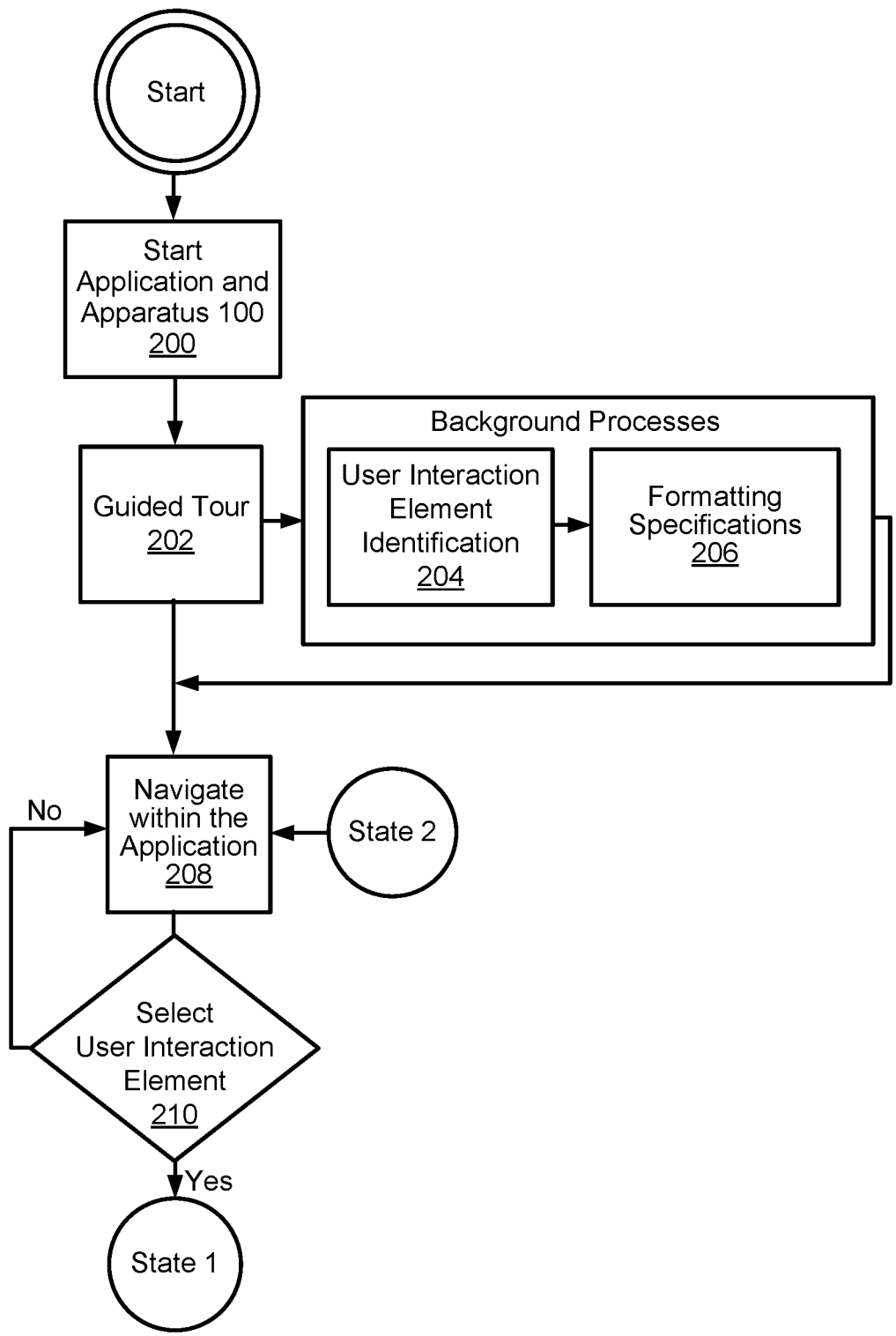
FIGS. 2 and 3 illustrate flowcharts to illustrate operation of the help content based application page analysis apparatus of FIG. 1.
Figure 3:
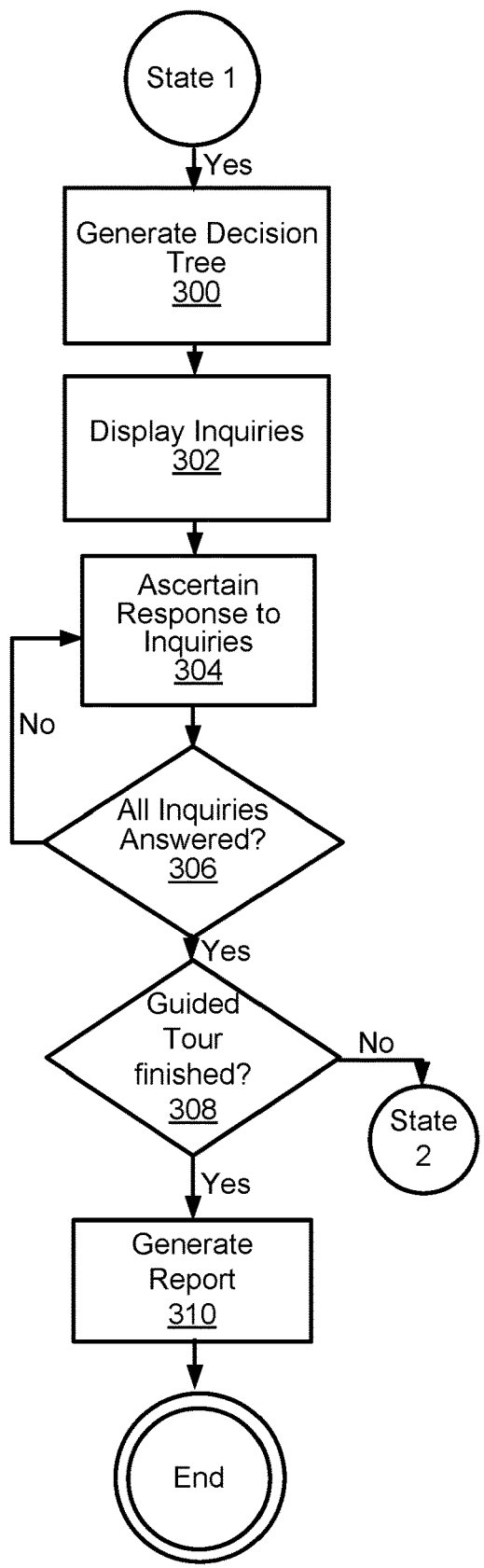

FIGS. 2 and 3 illustrate flowcharts to illustrate operation of the apparatus 100.

Referring to FIG. 2, at block 200, a help content creator may execute the application 102 in a web browser. As disclosed herein, the apparatus 100 may operate as a plugin or otherwise with respect to the web browser. At this stage, the page ascertaining module 104 is to ascertain, for the application 102, pages 106 that are to be analyzed with respect to application help content 108.

Figure 4:
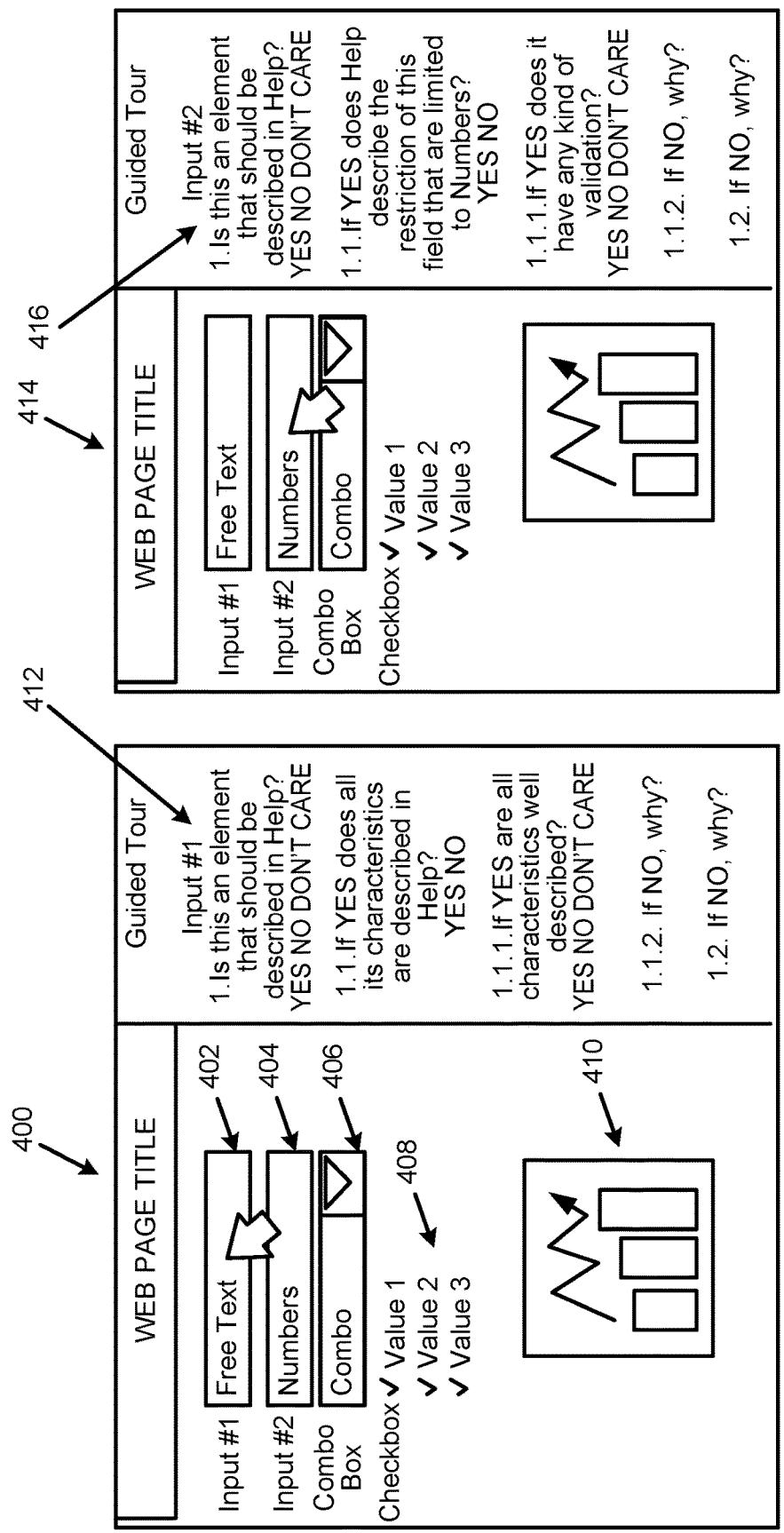
FIG. 4 illustrates a guided tour displaying questions to illustrate operation of the help content based application page analysis apparatus of FIG. 1.

At block 202, a side-panel "guided tour" may be displayed in the web browser as disclosed herein with respect to FIG. 4. The guided tour content may represent a display generated from the decision tree 120.

At block 204, the user interaction element identification module 110 is to identify, for each of the ascertained pages 106, the user interaction element 112.

At block 206, the user interaction element identification module 110 is to determine, for each of the identified user interaction elements 112, formatting specifications 114. Examples of the formatting specifications 114 may include numbers, minimum size, etc., for each of the identified user interaction elements 112.

At block 208, the help content creator may navigate within the application 102 on the web page.

At block 210, the help content creator may select or otherwise click on a user interaction element. In this regard, the user interaction element selection module 116 is to ascertain, for a page of the ascertained pages 106, selection of the user interaction element from the identified user interaction elements 112.

Referring to FIG. 3, at block 300, based on the selection of the user interaction element at block 210 of FIG. 2, the decision tree generation module 118 is to generate, based on the formatting specifications 114, the decision tree 120 to include inquiries 122 related to the formatting specifications of the selected user interaction element.

At block 302, the inquiries 122 of the decision tree 120 may be displayed on the side panel as described at block 202 of FIG. 2.

At block 304, the help content creator may be prompted to answer the inquiries 122 in that decision tree in order to analyze its content related to help content. In this regard, the response analysis module 124 is to ascertain, for the selected user interaction element, responses 126 to the inquiries 122 from the decision tree 120 that corresponds to the selected user interaction element.

At block 306, a determination is made as to whether all of the inquiries 122 are answered.

At block 308, in response to a determination that all of the inquiries are completed, if there are additional user interaction elements on the page, processing reverts to State 2 (see FIG. 2), until all of the user interaction elements for the page associated with the selected user interaction element are analyzed.

At block 310, the report generation module 140 is to generate the report 142 of the mapping of the responses 126 to the inquiries 122 to the help category of the plurality of help categories 138. The report 142 may be generated in a metadata format, such as JavaScript Object Notation, JSON.

FIG. 4 illustrates a guided tour displaying questions to illustrate operation of the apparatus 100.

Referring to FIG. 4, for a page 400 (e.g., one of the ascertained pages 106) of the application 102, user interaction elements may include input #1 at 402 (e.g., an input field for receiving user input), input #2 at 404 (e.g., an input field for receiving user input), a combo box at 406 (e.g., a drop-down menu to enable selection of an option from a further list of options displayed upon actuation of the drop-down menu), a checkbox at 408 (e.g., to enable selection of any number of options from a list of options), and an image at 410. With respect to input #1, if the help content creator selects the input #1, the corresponding decision tree 120 may be displayed at 412. Similarly, for the same page as shown at 414, if the help content creator selects the input #2, the corresponding decision tree 120 may be displayed at 416.

With respect to the input #1 at 402, the help content creator may select the input #1 to generate the decision tree at 412 with the inquiries 122. Since the input #1 indicates a "free text element", there are no specific inquiries on the demanded input formatting. The displayed decision tree at 412 may include the inquiries 122 to ascertain whether the input #1 is addressed by the help content description. The help content creator may also ignore user interaction elements that do not need help content by selecting "DON'T CARE", in which case the final report 142 may ignore such a user interaction element.

For the same page as shown at 414, if the help content creator selects the input #2, the corresponding decision tree 120 may be displayed at 416. In this regard, the input #2 includes a formatting constraint (e.g., numbers). The inquiries (e.g., Inquiry 1.1—"If YES does Help describe the restriction of this field that are limited to Numbers?") in the guided tour reflect this formatting constraint by both informing and requesting a specific action of including that constraint on the help content. If the help content creator decides not to include any of the user interaction elements (e.g., by choosing "NO") a reasoning may need to be provided, making the report more precise, complete, and useful.

Referring again to FIG. 1, with respect to the report 142, the report 142 may be based on an evaluation of the application complexity from the end user's perspective, with the user interaction elements being analyzed from their input complexity. The report 142 may present an evaluation of the help content creator on the current help content (e.g., the application help content 108), and recommendations for changes, also suggesting the most appropriate type of help content that should be created.

Figure 5:
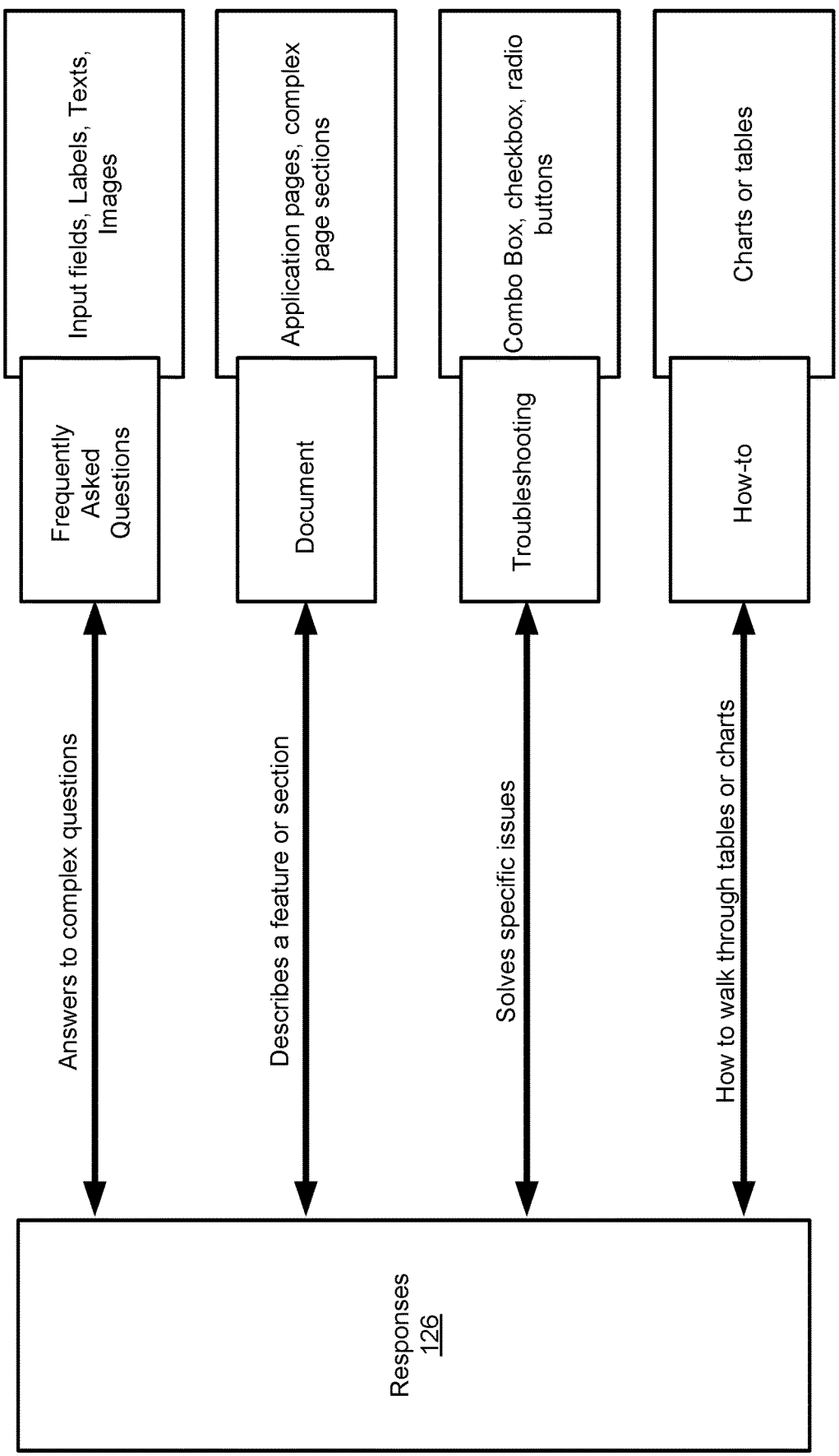
FIG. 5 illustrates help content article classification rules to illustrate operation of the help content based application page analysis apparatus of FIG. 1.

FIG. 5 illustrates help content article classification rules to illustrate operation of the apparatus 100.

With respect to FIG. 5, the report 142 may be based on a mapping of the responses 126 to the inquiries 122 to a help category of the plurality of help categories 138. For example, the mapping module 136 is to attach to the selected user interaction element, based on the mapping of the responses 126 to the inquiries 122 to the help category of the plurality of help categories 138, an article (or other information) that is relevant to the help category of the plurality of help categories 138. In this regard, referring to FIGS. 1 and 5, the responses 126 may be mapped to the categories of frequently asked questions (FAQs), documents, troubleshooting, and how-to articles. For example, frequently asked questions may provide answers to complex questions by an end user of the application 102 (e.g., for the example of FIG. 4, Input #1 and Input #2 may be covered by this section). Documents may describe a feature or section of the application 102 (e.g., each page of the application 102 may include its purpose covered in details by this type of article). A troubleshooting article may solve specific issues (e.g., the combo box at 406 of FIG. 4 may be populated with items that demand in depth knowledge on the application 102, such as specific naming labels). Further, the how-to articles may explain how to walk through a table or chart (e.g., the chart displayed at 410 in FIG. 4 may be described in this article).

FIG. 6 illustrates a metadata interaction report to illustrate operation of the apparatus 100.

Referring to FIG. 6, for the report 142, at 600, the ascertained pages 106 for the application 102 may be accounted for and considered by the item denoted "total-Pages". In this example, the analyzed application 102 may include seven pages 106, and the suggested article to describe this page is a "Document", as written in the last item "article" at 602. The score 130 at 604 may account for the total user interaction elements included in the current page of the application 102, and the responses given with respect to the decision tree inquiries on the guided tour.

As disclosed herein, the score 130 may be determined by determining a weighted value by dividing a default score value by the total number of user interaction elements. Further, the score determination module 128 may determine the score that represents relevancy of the page help content 132 to the application 102 by reducing the default score value by a total number of negative responses to the inquiries multiplied by the weighted value.

For example, with respect to the score 130, the score 130 may include '10' as a default score value. For each 'NO' response given, a weighted decrement takes place in the score (considering the total number of user interaction elements in the current page). For the example of FIGS. 4 and 6, there are '5' user interaction elements (e.g., 402, 404, 406, 408, and 410). Each user interaction element may contribute with '2' points to the final page score (e.g., starting score of '10' divided by '5', resulting in '2' as the weighted value for each user interaction element). The final score, considering that one of the user interaction elements would have a 'NO' answer, would be 8, as depicted in FIG. 6.

Referring again to FIGS. 1 and 6, each page of the application 102 may include an array of internal elements designated "listElements" as shown at 606. The listElements may include an "id" (e.g., an internal report identification), a "name" (e.g., as named in the page), a "type" (e.g., a field type expected), a "restriction" (e.g., field formatting), a "size" (e.g., as created in the page), "inserted" (e.g., if already included in the help content, if not considered, the field should include "DON'T CARE", if the user interaction element should not be inserted in the help content, a reason is provided), and "article" (e.g., recommended article to be generated).

Figure 7:
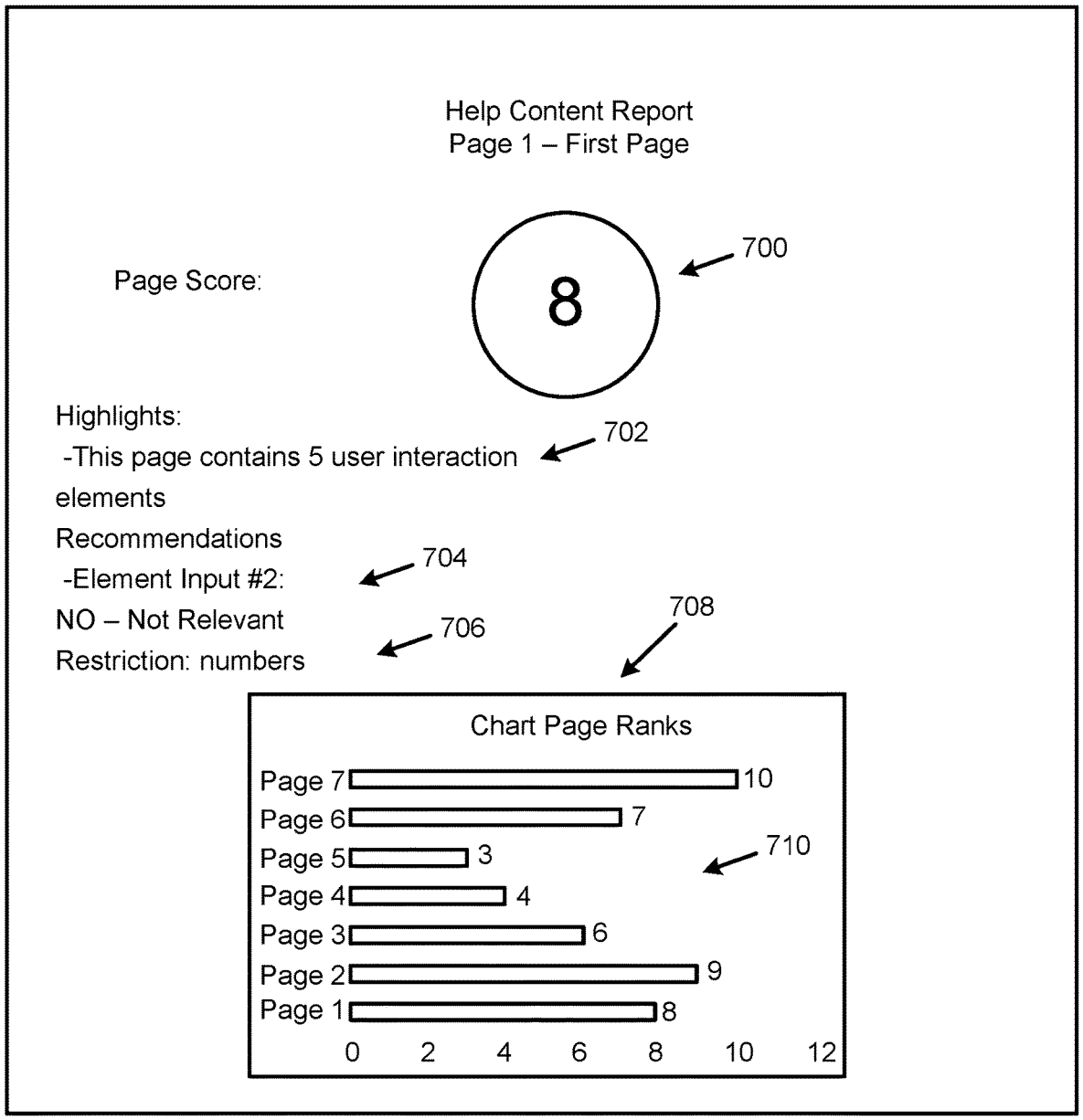
FIG. 7 illustrates a user customized interaction report to illustrate operation of the help content based application page analysis apparatus of FIG. 1.

FIG. 7 illustrates a user customized interaction report to illustrate operation of the apparatus 100.

Referring to FIGS. 6 and 7, the report 142 may be formatted in a variety of formats (e.g., HTML, DOC, Portable Document Format (PDF), etc.), allowing the help content creator to be able to achieve a relevant help content creation. In this regard, besides reviewing current help content to verify its accuracy and up-to-date characteristics, the help content creator may identify and address points and obstacles that the end user may encounter.

Referring to FIG. 7, the user customized interaction report may include a display of the score 130 (e.g., '8') for a particular page of the application 102 at 700, a number of user interaction elements at 702, an indication at 704 that element "Input #2" was chosen not to be inserted into the page help content 132 by the help content creator, restrictions at 706, etc. Further, a chart that shows the page rank relative to other pages of the application may be displayed at 708. For the chart, the ranking module 134 is to rank the ascertained pages 106 with respect to the application help content 108 based on the determined score 130 for the page and the determined scores for the other pages of the application 102. For example, the seven pages in the example of FIGS. 6 and 7 may be ranked according to the scores for each of the pages in ascending or descending order, or the pages may be chronologically ranked by page number with the scores being displayed in a bar-type graph as shown at 710.

Figure 8:
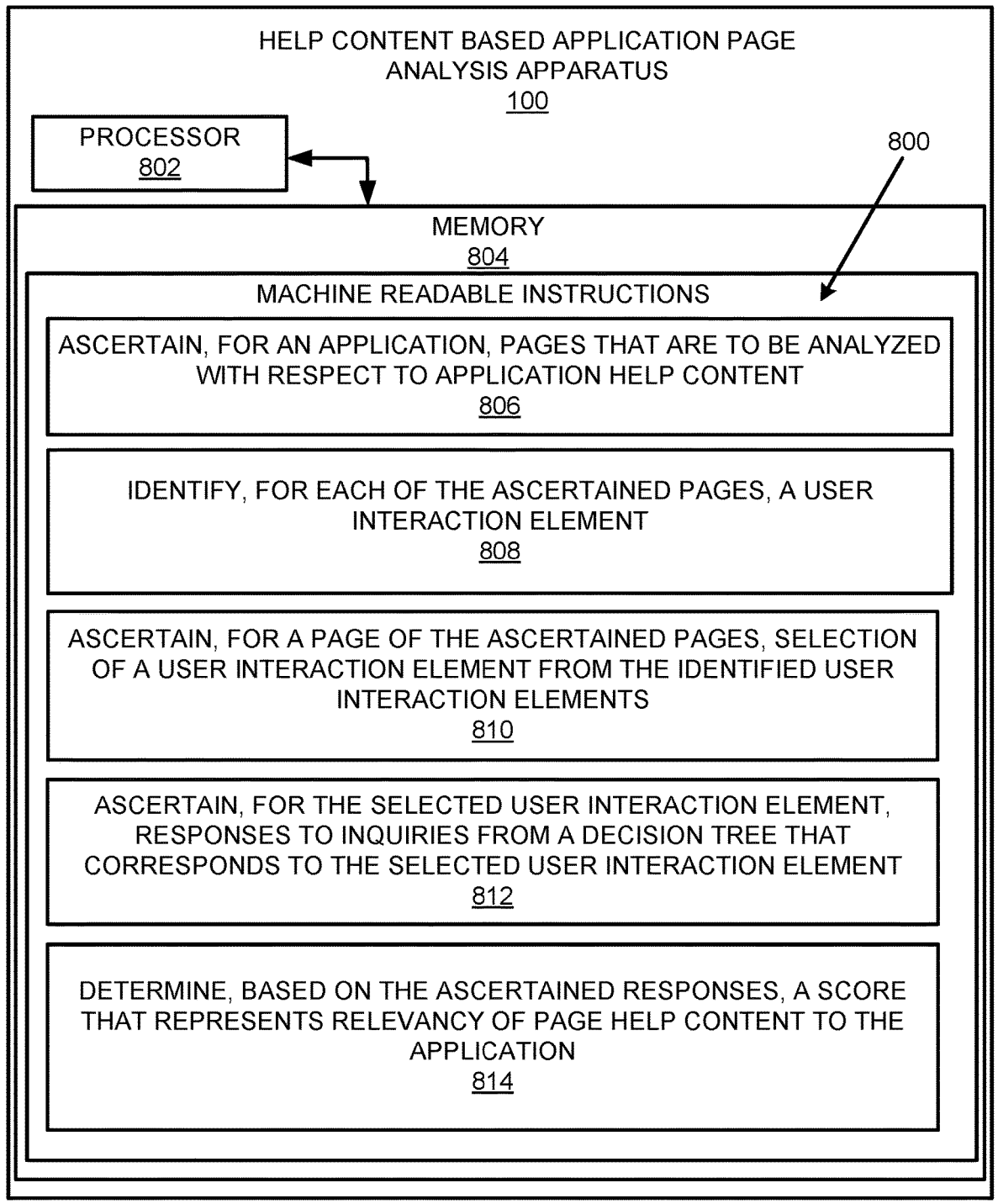
FIG. 8 illustrates an example block diagram for help content based application page analysis.
Figure 10:
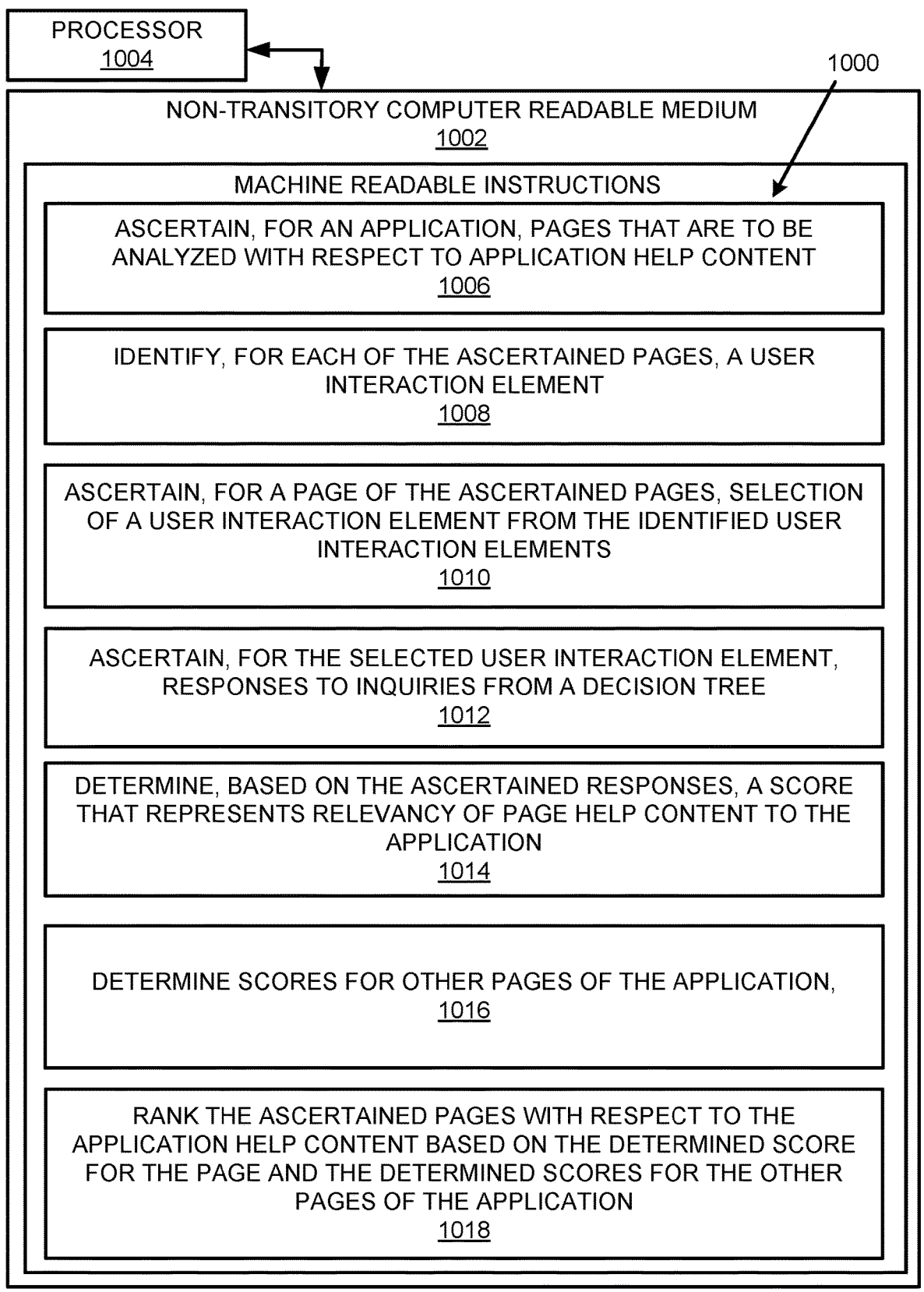
FIG. 10 illustrates a further example block diagram for help content based application page analysis.

FIGS. 8-10 respectively illustrate an example block diagram 800, an example flowchart of a method 900, and a further example block diagram 1000 for help content based application page analysis. The block diagram 800, the method 900, and the block diagram 1000 may be implemented on the apparatus 100 described above with reference to FIG. 1 by way of example and not limitation. The block diagram 800, the method 900, and the block diagram 1000 may be practiced in other apparatus. In addition to showing the block diagram 800, FIG. 8 shows hardware of the apparatus 100 that may execute the instructions of the block diagram 800. The hardware may include a processor 802, and a memory 804 (i.e., a non-transitory computer readable medium) storing machine readable instructions that when executed by the processor cause the processor to perform the instructions of the block diagram 800. The memory 804 may represent a non-transitory computer readable medium. FIG. 9 may represent a method for help content based application page analysis, and the steps of the method. FIG. 10 may represent a non-transitory computer readable medium 1002 having stored thereon machine readable instructions to provide help content based application page analysis. The machine readable instructions, when executed, cause a processor 1004 to perform the instructions of the block diagram 1000 also shown in FIG. 10.

The processor 802 of FIG. 8 and/or the processor 1004 of FIG. 10 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1002 of FIG. 10), such as hardware storage devices (e.g., RAM (random access memory), ROM (read only memory), EPROM (erasable, programmable ROM), EEPROM (electrically erasable, programmable ROM), hard drives, and flash memory). The memory 804 may include a RAM, where the machine readable instructions and data for a processor may reside during runtime.

Referring to FIGS. 1-8, and particularly to the block diagram 800 shown in FIG. 8, the memory 804 may include instructions 806 to ascertain, for the application 102, pages 106 that are to be analyzed with respect to application help content 108.

The processor 802 may fetch, decode, and execute the instructions 808 to identify, for each of the ascertained pages 106, a user interaction element 112.

The processor 802 may fetch, decode, and execute the instructions 810 to ascertain, for a page of the ascertained pages 106, selection of a user interaction element from the identified user interaction elements 112.

The processor 802 may fetch, decode, and execute the instructions 812 to ascertain, for the selected user interaction element, responses 126 to inquiries 122 from a decision tree 120 that corresponds to the selected user interaction element.

The processor 802 may fetch, decode, and execute the instructions 814 to determine, based on the ascertained responses 126, a score 130 that represents relevancy of page help content 132 to the application 102. The page help content 132 may be associated with the page and is part of the application help content 108.

Referring to FIGS. 1-7 and 9, and particularly FIG. 9, for the method 900, at block 902, the method may include ascertaining, for an application 102, pages 106 that are to be analyzed with respect to application help content 108.

At block 904 the method may include identifying, for each of the ascertained pages 106, a user interaction element 112.

At block 906 the method may include ascertaining, for a page of the ascertained pages 106, selection of a user interaction element from the identified user interaction elements 112.

At block 908 the method may include ascertaining, for the selected user interaction element, responses 126 to inquiries 122 from a decision tree 120 that corresponds to the selected user interaction element.

At block 910 the method may include determining, based on the ascertained responses 126, a score 130 that represents relevancy of page help content 132 to the application 102. The page help content 132 may be associated with the page and is part of the application help content 108.

At block 912 the method may include ranking the ascertained pages 106 with respect to the application help content 108 by ranking the page according to the score 130 and determined scores for other pages of the application 102.

Referring to FIGS. 1-7 and 10, and particularly FIG. 10, for the block diagram 1000, the non-transitory computer readable medium 1002 may include instructions 1006 to ascertain, for an application 102, pages 106 that are to be analyzed with respect to application help content 108.

The processor 1004 may fetch, decode, and execute the instructions 1008 to identify, for each of the ascertained pages 106, a user interaction element 112.

The processor 1004 may fetch, decode, and execute the instructions 1010 to ascertain, for a page of the ascertained pages 106, selection of a user interaction element from the identified user interaction elements 112.

The processor 1004 may fetch, decode, and execute the instructions 1012 to ascertain, for the selected user interaction element, responses 126 to inquiries 122 from a decision tree 120.

The processor 1004 may fetch, decode, and execute the instructions 1014 to determine, based on the ascertained responses 126, a score 130 that represents relevancy of page help content 132 to the application 102.

The processor 1004 may fetch, decode, and execute the instructions 1016 to determine scores for other pages of the application 102. The ascertained pages 106 may include the page and the other pages.

The processor 1004 may fetch, decode, and execute the instructions 1018 to rank the ascertained pages 106 with respect to the application help content 108 based on the determined score 130 for the page and the determined scores for the other pages of the application 102.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
   a processor; and
   a non-transitory computer readable medium storing machine readable instructions that when executed by the processor cause the processor to:
   ascertain, for an application, pages that are to be analyzed with respect to application help content;
   identify, for each of the ascertained pages, a user interaction element;
   ascertain, for a page of the ascertained pages, selection of a user interaction element from the identified user interaction elements;
   ascertain, for the selected user interaction element, responses to inquiries from a decision tree that corresponds to the selected user interaction element; and
   determine, based on the ascertained responses, a score that represents relevancy of page help content to the application, wherein the page help content is associated with the page and is part of the application help content.

2. The apparatus according to claim 1, wherein the instructions are further to cause the processor to:
   determine scores for other pages of the application, wherein the ascertained pages include the page and the other pages; and
   rank the ascertained pages with respect to the application help content based on the determined score for the page and the determined scores for the other pages of the application.

3. The apparatus according to claim 1, wherein the identified user interaction elements include at least one of:
   an input field for receiving user input;
   a checkbox to enable selection of any number of options from a list of options;
   a radio button to limit selection of an option from another list of options;
   a drop-down menu to enable selection of an option from a further list of options displayed upon actuation of the drop-down menu;
   an action button to enable performance of an action upon selection of the action button;
   a table that displays data; or
   an image that displays information.

4. The apparatus according to claim 1, wherein the instructions are further to cause the processor to:
   determine, for each of the identified user interaction elements, formatting specifications; and
   generate, based on the formatting specifications, the decision tree to include the inquiries related to the formatting specifications of the selected user interaction element.

5. The apparatus according to claim 1, wherein the instructions are further to cause the processor to:
   map the responses to the inquiries to a help category of a plurality of help categories; and
   generate a report of the mapping of the responses to the inquiries to the help category of the plurality of help categories.

6. The apparatus according to claim 5, wherein the instructions are further to cause the processor to:
   attach to the selected user interaction element, based on the mapping of the responses to the inquiries to the help category of the plurality of help categories, an article that is relevant to the help category of the plurality of help categories.

7. The apparatus according to claim 1, wherein the instructions to determine, based on the ascertained responses, the score that represents relevancy of page help content to the application further comprise instruction to cause the processor to:
ascertain a default score value;
ascertain, for the page, a total number of user interaction elements;
determine a weighted value by dividing the default score value by the total number of user interaction elements; and
determine the score that represents relevancy of page help content to the application by reducing the default score value by a total number of negative responses to the inquiries multiplied by the weighted value.

8. A computer implemented method comprising:
ascertaining, for an application, pages that are to be analyzed with respect to application help content;
identifying, for each of the ascertained pages, a user interaction element;
ascertaining, for a page of the ascertained pages, selection of a user interaction element from the identified user interaction elements;
ascertaining, for the selected user interaction element, responses to inquiries from a decision tree that corresponds to the selected user interaction element;
determining, based on the ascertained responses, a score that represents relevancy of page help content to the application, wherein the page help content is associated with the page and is part of the application help content; and
ranking the ascertained pages with respect to the application help content by ranking the page according to the score and determined scores for other pages of the application.

9. The method according to claim 8, wherein the identified user interaction elements include at least one of:
an input field for receiving user input;
a checkbox to enable selection of any number of options from a list of options;
a radio button to limit selection of an option from another list of options;
a drop-down menu to enable selection of an option from a further list of options displayed upon actuation of the drop-down menu;
an action button to enable performance of an action upon selection of the action button;
a table that displays data; or
an image that displays information.

10. The method according to claim 8, further comprising:
determining, for each of the identified user interaction elements, formatting specifications; and
generating, based on the formatting specifications, the decision tree to include the inquiries related to the formatting specifications of the selected user interaction element.

11. The method according to claim 8, further comprising:
mapping the responses to the inquiries to a help category of a plurality of help categories; and
generating a report of the mapping of the responses to the inquiries to the help category of the plurality of help categories.

12. The method according to claim 11, further comprising:
attaching to the selected user interaction element, based on the mapping of the responses to the inquiries to the help category of the plurality of help categories, an article that is relevant to the help category of the plurality of help categories.

13. A non-transitory computer readable medium having stored thereon machine readable instructions, the machine readable instructions, when executed, cause a processor to:
ascertain, for an application, pages that are to be analyzed with respect to application help content;
identify, for each of the ascertained pages, a user interaction element;
ascertain, for a page of the ascertained pages, selection of a user interaction element from the identified user interaction elements;
ascertain, for the selected user interaction element, responses to inquiries from a decision tree;
determine, based on the ascertained responses, a score that represents relevancy of page help content to the application;
determine scores for other pages of the application, wherein the ascertained pages include the page and the other pages; and
rank the ascertained pages with respect to the application help content based on the determined score for the page and the determined scores for the other pages of the application.

14. The non-transitory computer readable medium according to claim 13, wherein the machine readable instructions, when executed, further cause the processor to:
determine, for each of the identified user interaction elements, formatting specifications; and
generate, based on the formatting specifications, the decision tree to include the inquiries related to the formatting specifications of the selected user interaction element.

15. The non-transitory computer readable medium according to claim 13, wherein the machine readable instructions to determine, based on the ascertained responses, the score that represents relevancy of page help content to the application, when executed, further comprise instructions to cause the processor to:
ascertain a default score value;
ascertain, for the page, a total number of user interaction elements;
determine a weighted value by dividing the default score value by the total number of user interaction elements; and
determine the score that represents relevancy of page help content to the application by reducing the default score value by a total number of negative responses to the inquiries multiplied by the weighted value.

* * * * *